(12) United States Patent
Kimura et al.

(10) Patent No.: US 8,794,673 B2
(45) Date of Patent: Aug. 5, 2014

(54) HYDRAULIC EXCAVATOR

(71) Applicant: Komatsu, Ltd., Tokyo (JP)

(72) Inventors: Youichirou Kimura, Komatsu (JP); Jun Yonehara, Komatsu (JP); Risa Yamamoto, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/823,381

(22) PCT Filed: Sep. 28, 2012

(86) PCT No.: PCT/JP2012/075074
§ 371 (c)(1),
(2), (4) Date: Mar. 14, 2013

(87) PCT Pub. No.: WO2014/020777
PCT Pub. Date: Feb. 6, 2014

(65) Prior Publication Data
US 2014/0083781 A1    Mar. 27, 2014

(30) Foreign Application Priority Data
Aug. 3, 2012    (JP) .................................. 2012-172602

(51) Int. Cl.
| | |
|---|---|
| *E02F 3/00* | (2006.01) |
| *E02F 9/00* | (2006.01) |
| *B60K 15/01* | (2006.01) |
| *E02F 9/16* | (2006.01) |
| *E02F 9/18* | (2006.01) |

(52) U.S. Cl.
CPC .................. *B60K 15/013* (2013.01); *E02F 9/00* (2013.01); *E02F 9/166* (2013.01); *E02F 9/18* (2013.01)
USPC ............................ 280/834; 180/326; 180/327

(58) Field of Classification Search
USPC .................................... 280/834; 180/326, 327
See application file for complete search history.

(56) References Cited

U.S. PATENT DOCUMENTS 6,485,088 B1 * 11/2002 Miyachi et al. ........... 296/190.08
6,499,556 B1 * 12/2002 Koyama ........................ 180/311
(Continued)

FOREIGN PATENT DOCUMENTS

| | | |
|---|---|---|
| JP | 2005-68962 A | 3/2005 |
| JP | 2008-38469 A | 2/2008 |
| JP | 2009-179960 A | 8/2009 |

OTHER PUBLICATIONS

International Search Report of corresponding PCT Application No. PCT/JP2012/075074.

*Primary Examiner* — Kevin Hurley
*Assistant Examiner* — Michael Stabley
(74) *Attorney, Agent, or Firm* — Global IP Counselors, LLP

(57) ABSTRACT

A hydraulic excavator includes an undercarriage having a crawler and a rotating superstructure. The rotating superstructure includes a plate-shaped rotating frame, an engine, a fuel tank a counterweight and a fuel line. The engine is mounted inside the rotating frame. The fuel tank is disposed on one side of the engine. The counterweight is supported on the rotating frame to the rear of the engine, and disposed so that a bottom end portion faces a rear end surface of the rotating frame with a gap interposed therebetween and the gap is open to the atmosphere. The fuel line is connected to the fuel tank and disposed in the gap between the rear end surface of the rotating frame and the bottom end portion of the counterweight.

7 Claims, 8 Drawing Sheets

(56) References Cited

U.S. PATENT DOCUMENTS

| | | | |
|---|---|---|---|
| 6,601,324 B2* | 8/2003 | Iwasa et al. | 37/347 |
| 6,622,668 B2* | 9/2003 | Izumi | 123/41.49 |
| 7,036,251 B2* | 5/2006 | Kojima et al. | 37/466 |
| 7,988,167 B2* | 8/2011 | Sakitani et al. | 280/163 |
| 8,403,099 B2* | 3/2013 | Yokota | 180/309 |
| 8,459,014 B2* | 6/2013 | Kamiya et al. | 60/295 |
| 8,573,646 B2* | 11/2013 | Kamiya | 280/759 |
| 8,602,147 B2* | 12/2013 | Miyachi | 180/69.4 |
| 2009/0115223 A1* | 5/2009 | Tsukamoto | 296/190.04 |
| 2010/0071986 A1* | 3/2010 | Miyachi | 180/326 |
| 2010/0290883 A1* | 11/2010 | Kitatani et al. | 414/719 |
| 2010/0293928 A1* | 11/2010 | Kamiya et al. | 60/295 |
| 2011/0018308 A1* | 1/2011 | Uto et al. | 296/181.1 |
| 2011/0088637 A1* | 4/2011 | Hirasawa et al. | 123/41.31 |
| 2012/0067660 A1* | 3/2012 | Kashu et al. | 180/296 |
| 2013/0037551 A1* | 2/2013 | Nishiyama et al. | 220/564 |
| 2013/0343853 A1* | 12/2013 | Sato et al. | 414/719 |

* cited by examiner

HYDRAULIC EXCAVATOR

CROSS-REFERENCE TO RELATED APPLICATIONS

This application claims priority to Japanese Patent Application No. 2012-172602 filed on 3 Aug. 2012, the disclosure of which is hereby incorporated herein by reference in its entirety.

FIELD OF THE INVENTION

The present invention relates to a hydraulic excavator, and in particular relates to a hydraulic excavator in which a fuel line is disposed at a rear portion of a revolving frame.

BACKGROUND ART

A hydraulic excavator includes an undercarriage having a crawler, and a rotating superstructure supported in a rotatable manner above the undercarriage. An engine, a hydraulic drive device, a fuel tank, a cooling unit and the like are mounted on the rotating superstructure, and furthermore a counterweight is mounted on the rear portion of the rotating superstructure.

Japanese Patent Laid-open No. 2009-179960 describes a fuel tank, a fuel pump, and a fuel line and the like previously assembled in a support member as a fuel system sub-assembly in order to improve assembly workability. Accordingly, assembly workability is improved by mounting the assembled fuel system sub-assembly as one component in the rotating frame.

In Japanese Patent Laid-open No. 2005-68962, a fuel line structure in a hydraulic excavator is described that suppresses strength reduction in a side plate that constitutes a rotating frame and improves fuel line installation workability. Specifically, in the Japanese Patent Laid-open No. 2005-68962, the rotating frame is constituted mainly by an I-type steel and the fuel line is installed near the end portions of a pair of side plates along an outer edge portion of the rotating frame, and further the fuel line straddles one of the side plates and is installed along an upper edge of an end plate.

SUMMARY

Fuel is supplied from a fuel tank through a fuel filter to an engine. Excess fuel flows to a fuel cooler and is returned to the fuel tank through a return line after being cooled in the fuel cooler.

In the above fuel line configuration, when the fuel line is laid to the rear and below the engine inside the engine room as in Patent Documents 1 and 2, the temperature of the fuel inside the line increases due to heat from the engine. In particular, in the conventional fuel line structures, since the return line from the fuel cooler to the fuel tank is disposed inside the engine room, the fuel inside the return line cooled by the fuel cooler is heated by heat from the engine, thus making it difficult to establish a proper heat balance. When the temperature of the fuel increases, there is a problem that the durability of seating parts in the fuel filter and the fuel injection device is reduced and fuel consumption deteriorates.

An object of the present invention is to suppress the rise in temperature of fuel inside e fuel line due to heat from the engine.

A hydraulic excavator according to a first aspect of the present invention includes an undercarriage having a crawler, and a rotating superstructure supported in a rotatable manner above the undercarriage. The rotating superstructure includes a plate-shaped rotating frame, an engine mounted inside the rotating frame, a fuel tank disposed on one side of the engine, a counterweight, and a fuel line. The counterweight is supported on the rotating frame to the rear of the engine, and is disposed so that a bottom end portion faces a rear end surface of the rotating frame with a gap interposed therebetween and the gap is open to the atmosphere. The fuel line is connected to the fuel tank and is disposed in a gap between the rear end surface of the rotating frame and the bottom portion end of the counterweight.

The gap is formed between the bottom end portion of the counterweight and the rear end surface of the rotating frame, and the fuel line is disposed in the gap. As a result, the fuel line is not easily affected by heat from the engine. Moreover, since the gap between the rotating frame and the counterweight is open to the atmosphere, the fuel inside the fuel line is cooled by the atmosphere and the rise in temperature is suppressed.

The hydraulic excavator according to a second aspect of the present invention is related to the hydraulic excavator of the first aspect, wherein an engine room having the engine disposed therein is configured above the rotating frame. The engine room and a gap in which the fuel line is disposed are shielded.

A further rise in the temperature of the fuel in the fuel line can be suppressed due to the engine room and a gap in which the fuel tine is disposed being shielded.

The hydraulic excavator according to a third aspect of the present invention is related to the hydraulic excavator of the second aspect and further includes a heat insulation member that separates the gap in which the fuel line is disposed and the engine room.

By separating the gap in which the fuel line is disposed and the engine room with the heat insulation member, heat from the engine room can be prevented from intruding into the gap in which the fuel line is disposed with a configuration that is more simple than a case in which the gap in which the fuel line is disposed is shielded from the engine room by the counterweight and the rotating frame.

The hydraulic excavator according to a fourth aspect of the present invention is related to the hydraulic excavator of any of the first to third aspects, wherein the rear end surface of the rotating frame has a first end surface formed at a bottom end and a second end surface formed above the first end surface and further forward than the first end surface. Moreover, the gap between the rotating frame and the counterweight includes a first gap formed between the first end surface and the counterweight bottom end portion, and a second gap that is wider than the first gap and is formed between the second end surface and the counterweight bottom end portion. A portion of a bottom plate of the rotating frame is directly below the fuel tine in the second gap.

Since the gap between the counterweight and the rotating frame is open to the atmosphere, it is conceivable that sand and dirt and the like may intrude into the gap and damage the fuel line.

Accordingly, with the hydraulic excavator of the fourth aspect, the rear end surfaces of the rotating frame are formed with the first end surface and the second end surface in a stepped manner, the fuel line is disposed in the stepped portion, and the portion of the bottom plate of the rotating frame is configured to be directly below the fuel tine in the second gap. As a result, the fuel line is protected by the rear end surfaces of the rotating frame. Therefore, cooling of the fuel line with the atmosphere is possible and damage to the fuel line by matter intruding from outside is prevented.

The hydraulic excavator according to a fifth aspect of the present invention is related to the hydraulic excavator of any of the first to fourth aspects and further includes a fuel cooler disposed on another side of the engine. The fuel line is a returning line from the fuel cooler to the fuel tank.

The return line that returns fuel from the fuel cooler to the fuel tank distributes the fuel cooled in the fuel cooler as described above. Therefore, a rise in the temperature of the cooled fuel is suppressed due to the disposition of the return line in the gap between the rotating frame and the counterweight.

As described above in the present invention, fuel that flows through the fuel line is not easily affected by heat from the engine and is cooled by the atmosphere to suppress a rise in the temperature since the fuel line is disposed in a gap between the counterweight and the rotating frame and the gap is open to the atmosphere.

DESCRIPTION OF EMBODIMENTS

Overall Configuration

Figure 1:
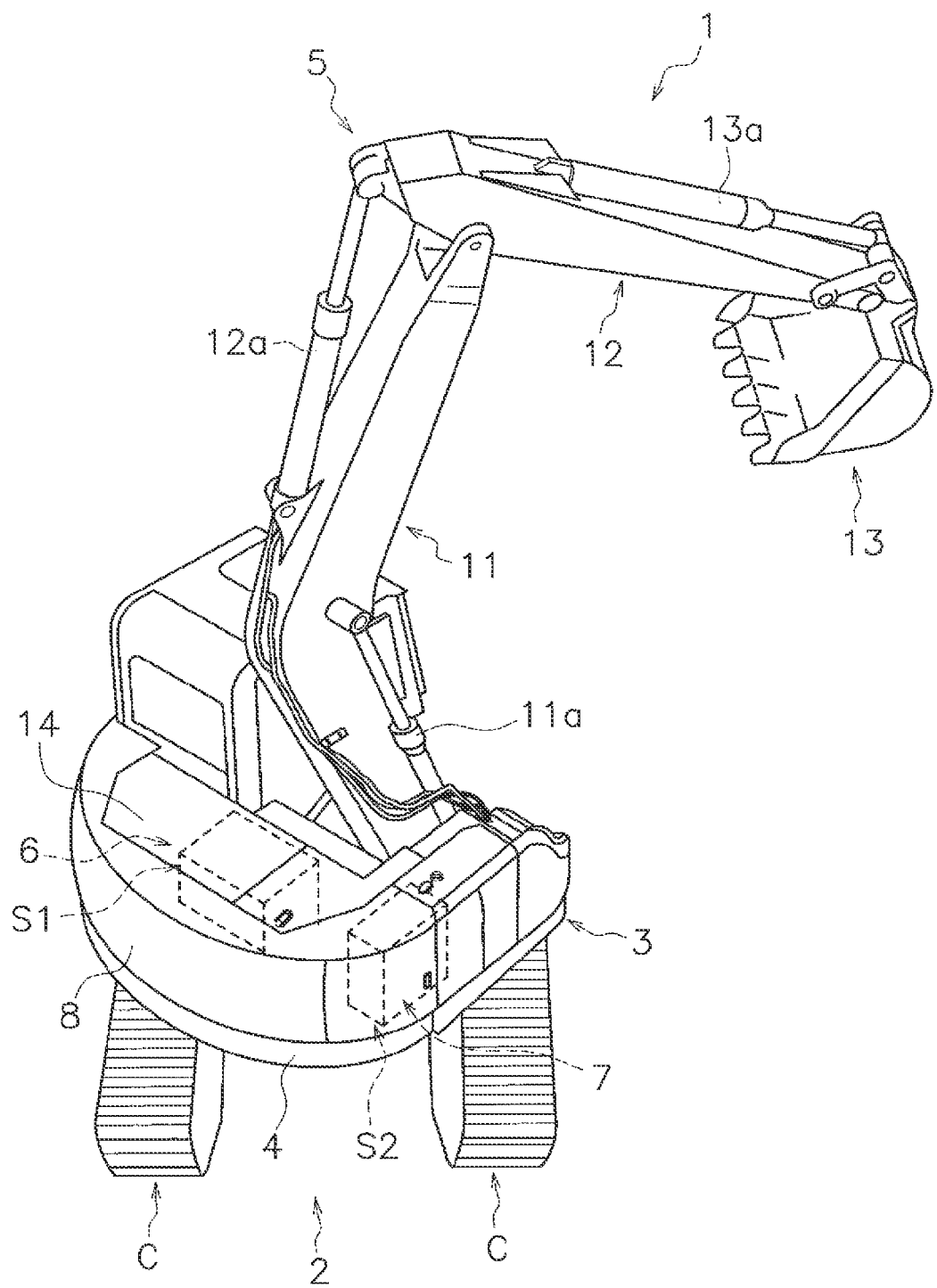
FIG. 1 is an external schematic diagram of a hydraulic excavator according to an embodiment of the present invention.
Figure 2:
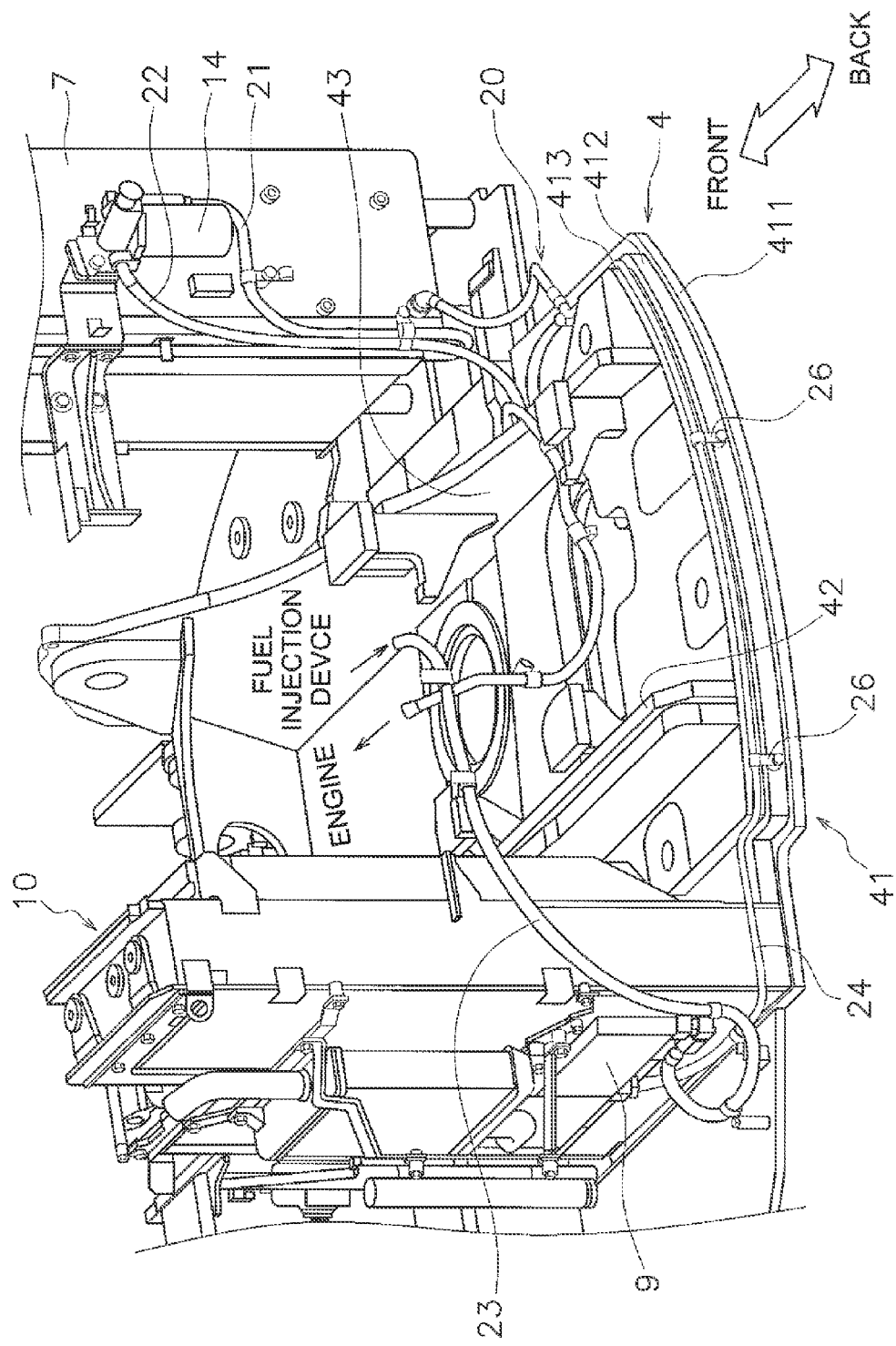
FIG. 2 is a diagram illustrating rear portion of the hydraulic excavator.

A hydraulic excavator 1 of the present embodiment is a reduced-tail-swing excavator and includes an undercarriage 2 and a rotating superstructure 3 as illustrated in FIG. 1. FIG. 1 is an external schematic diagram of the hydraulic excavator 1 as seen from the rear. Additionally, FIG. 2 shows a rear portion structure of the hydraulic excavator 1 with a vehicle body cover, the engine, and the counterweight removed. A belowmentioned sponge member used as heat insulation is omitted in FIG. 2

The undercarriage 2 has crawlers C on the left and right sides, and the hydraulic excavator 1 is able to move forward and backward by rotating the crawlers C.

The rotating superstructure 3 is mounted in a rotatable manner on the undercarriage 2. As illustrated in FIGS. 1 and 2, the rotating superstructure 3 is equipped with a rotating frame 4, working equipment 5, an engine 6, a fuel tank 7, a counterweight 8, and a cooling unit 10 that includes a fuel cooler 9.

The rotating frame 4 includes a bottom plate 41 formed with a thick steel plate, and left and right upright plates 42, 43 and the like. The working equipment 5, the engine 6, the fuel tank 7, the counterweight 8, and the cooling unit 10 are supported on the rotating frame 4.

The working equipment 5 is supported at the front of the rotating frame 4, and includes a boom 11 that is bent in a middle portion, an arm 12 that is attached to a distal end of the boom 11, and a bucket 13 that is attached to a distal end of the arm 12 as illustrated in FIG. 1. The hydraulic excavator 1 is able to perform excavation of dirt and sand and the like while causing the boom 11, the arm 12, and the bucket 13 to move up and down by driving hydraulic cylinders 11a, 12a, and 13a with hydraulic fluid supplied through a hydraulic hose not shown.

The engine 6 is mounted inside an engine room S1 at the rear portion of the rotating frame 4. The fuel tank 7 is disposed on one side of the engine 6 and the cooling unit 10 is disposed on the other side with the engine 6 interposed therebetween, A fuel filter 14 is provided on the rear side surface of the fuel tank 7. Although a main filter and a sub-filter are provided as the fuel filter 14, details are omitted here.

Figure 3:
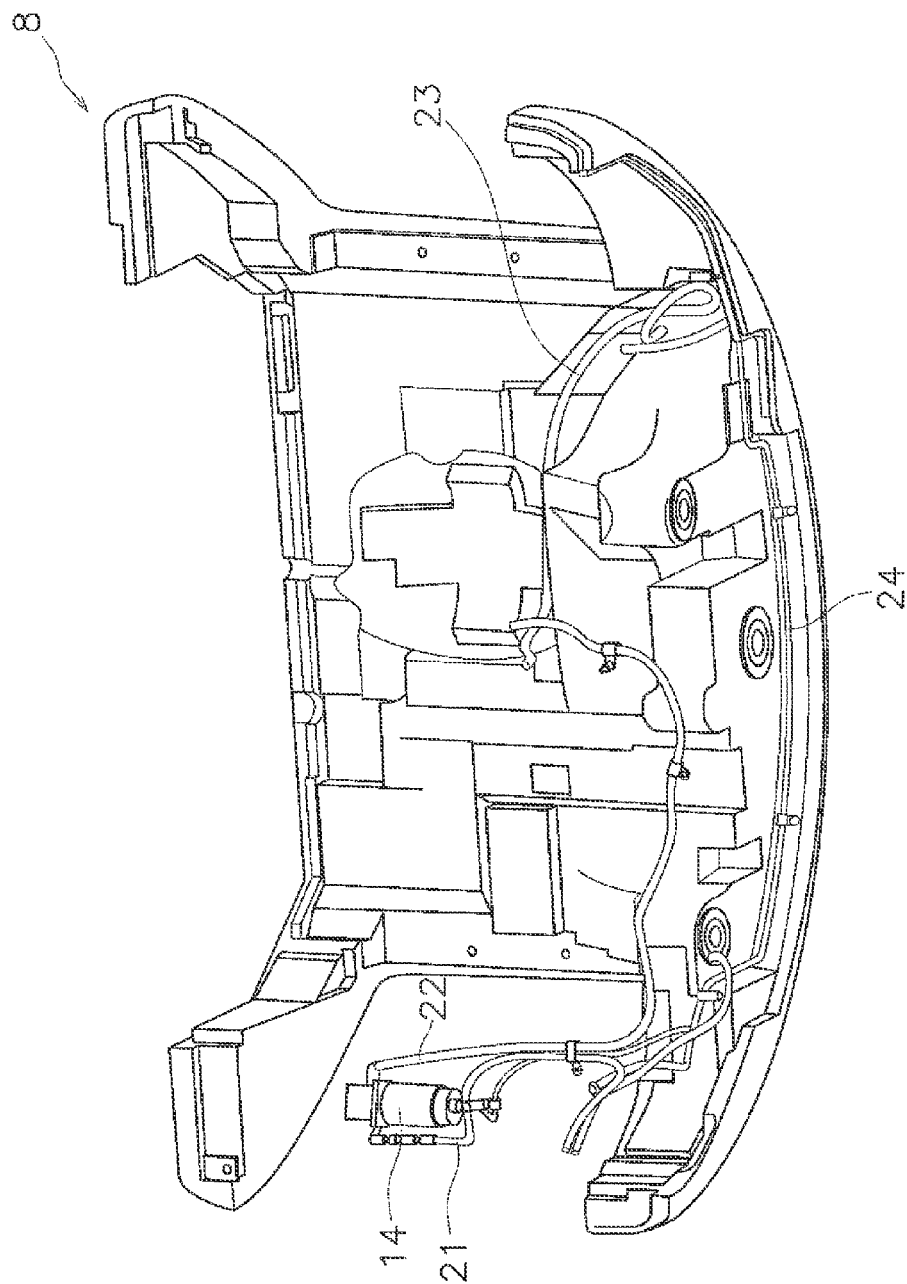
FIG. 3 is an external schematic diagram of a counterweight.

The counterweight 8 is supported at the rear end portion of the rotating frame 4 to the rear of the engine room S1. FIG. 3 shows the counterweight 8 as seen from the front.

Fuel Line Structure

Fuel flows through a path from the fuel tank 7 to the fuel filter 14 to the engine 6 to the fuel cooler 9 to the fuel tank 7. A fuel line 20 is laid between these elements. More specifically, a first line 21 is provided between the fuel tank 7 and the fuel filter 14, a second line 22 is provided between the fuel filter 14 and the engine 6, and a third line 23 is provided between the engine 6 and the fuel cooler 9. A fourth line (return line) 24 is further provided between the filet cooler and the fuel tank 7.

One end of the first line 21 is coupled to the fuel tank 7. The first line 21 extends upward from the bottom of the fuel tank 7 and the other end is coupled to the top of the fuel filter 14. One end of the second line 22 is coupled to the top of the fuel filter 14. The second line 22 extends downward from the top of the fuel filter 14 to the bottom plate 41 of the rotating frame 4, straddles the top of the right upright plate 43 and extends along the top surface of the bottom plate 41 to a middle portion in the crosswise direction. The second line 22 further extends upward from the bottom plate 41 and the other end is coupled to a fuel injection device (not shown) of the engine 6.

One end of the third line 23 is coupled to the fuel injection device of the engine 6. The third line 23 extends in a transverse direction from the fuel injection device, crosses the rear side surface of the cooling unit 10 at the outside of the vehicle (left direction) and further extends to the outside and downward. The other end of the third line 23 is coupled to the fuel cooler 9.

One end of the fourth line 24 that functions as the return line is coupled to the bottom end portion of the fuel cooler 9. The fourth line 2.4 extends rearward from the bottom end portion of the fuel cooler 9, further extends on the vehicle inner side (right direction) along the rear side surface of the cooling unit 10, and extends along the rear end surface of the bottom plate 41 of the rotating frame 4 to the right side end portion of the bottom plate 41. The fourth line 24 then extends to the fuel tank 7 and the other end is coupled to the fuel tank 7.

Figure 4:
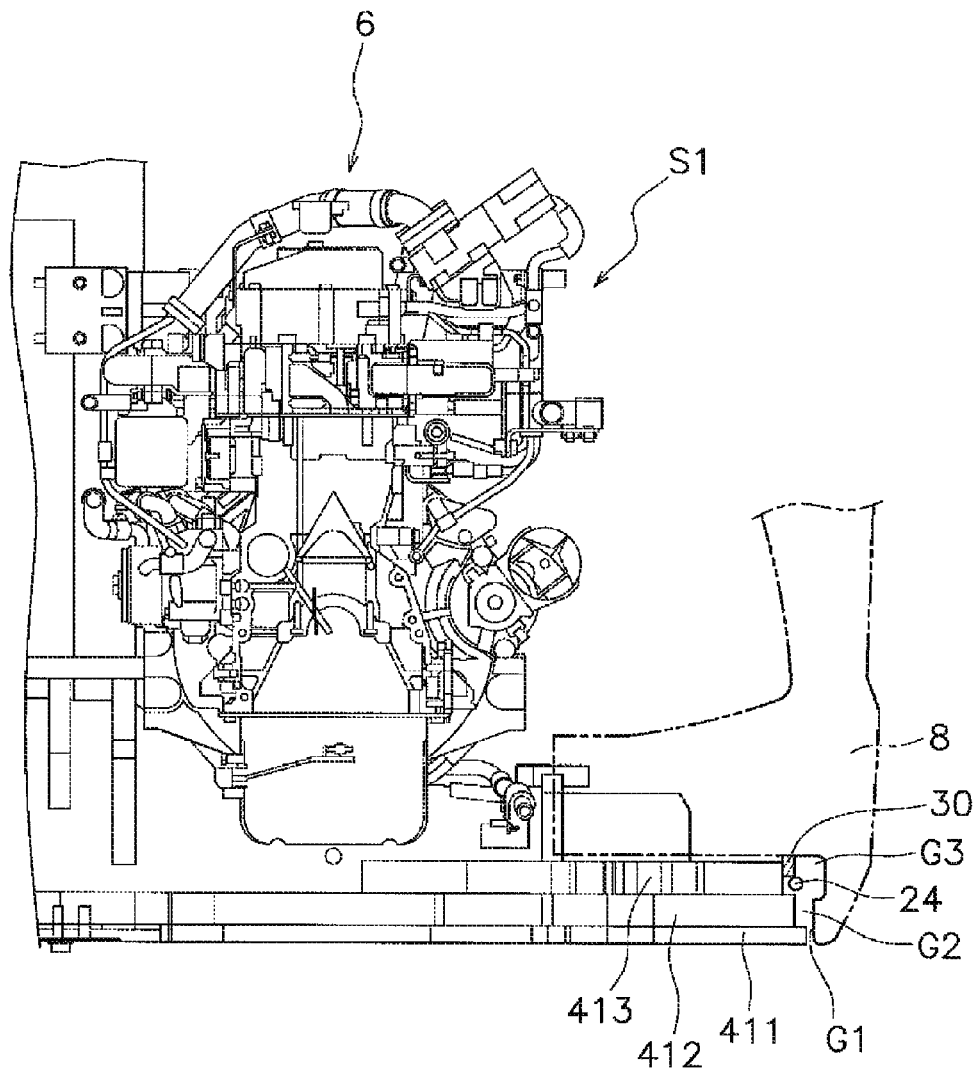
FIG. 4 is a side view of a rear portion of the hydraulic excavator.
Figure 5:
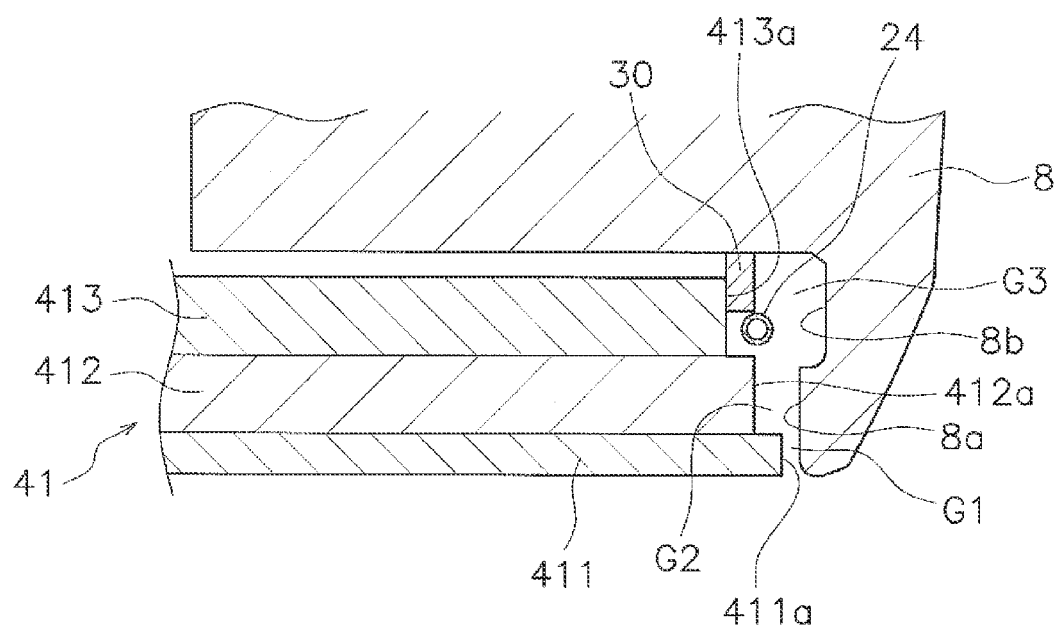
FIG. 5 is an enlarged fragmentary view of FIG. 4.

Next a more detailed explanation of the structure of the portion in which the fourth line 24 is laid will be provided. FIG. 4 illustrates a portion where the engine room S1 and the counterweight 8 are disposed as seen from the left side of the vehicle. FIG. 5 is an enlarged cross-section of the rear end surface of the bottom plate 41 of the rotating frame 4 and the bottom end portion of the counterweight 8.

As can be seen in FIGS. 4 and 5, the bottom plate 41 is configured by a first bottom plate 411 at the bottom and that is relatively thin, and a second bottom plate 412 and a third bottom plate 413 that are stacked above the first bottom plate 411. The second bottom plate 412 and the third bottom plate 413 have substantially the same thickness and are thicker than the first bottom plate 411. A rear end surface 411a of the first bottom plate 411 protrudes the furthest to the back. A rear end surface 412a of the second bottom plate 412 is positioned further forward than the rear end surface 411a of the first bottom plate 411, and moreover a rear end surface 413a of the third bottom plate 413 is positioned further forward than the rear end surface 412a of the second bottom plate 412. Specifically, the three bottom plates 411, 412, 413 are stacked so that the rear end surfaces 411a, 412a, 413a are step-like, and thus steps are formed between the bottom plates 411 to 413.

On the other hand, the bottom end portion of the counterweight 8 has a first end surface 8a that faces both of the rear end surfaces 411a, 412a of the respective first bottom plate 411 and the second bottom plate 412, and a second end surface 8b that faces the rear end surface 413a of the third bottom plate 413. The first end surface 8a is positioned further forward than the second end surface 8b. A first gap G1 is formed between the rear end surface 411a of the first bottom plate 411 and the first end surface 8a of the counterweight 8, and a second gap G2 is formed between the rear end surface 412a of the second bottom plate 412 and the first end surface 8a of the counterweight 8. A third gap G3 is formed between the rear end surface 413a of the third bottom plate 413 and the second end surface 8b of the counterweight 8. A space in the front to back direction is the narrowest in the first gap G1, is wider than the first gap G1 in the second gap G2, and is wider than the second gap G2 in the third gap G3. The gaps G1 to G3 are open to the atmosphere and the atmosphere is able to intrude into the gaps G1 to G3.

As can be seen from FIGS. 2 and 5, the fourth line 24 is disposed in the third gap G3 along the rear end surface 413a of the third bottom plate 413 and supported on the second bottom plate 412 by a plurality of clamps 26. Additionally, the fourth line 24 is disposed at a location that does not overlap with the first gap G1 in the front to back direction.

Figure 6:
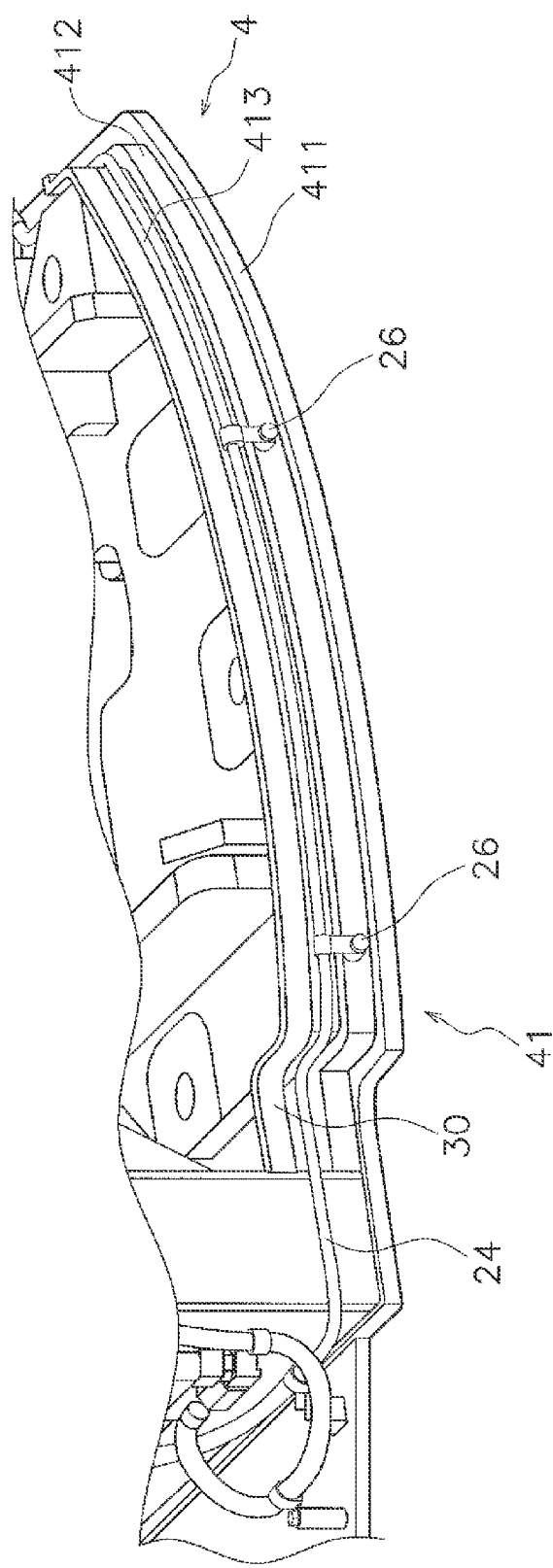
FIG. 6 is a diagram illustrating a state of installation of a sponge member for heat insulation.

As illustrated in FIGS. 5 and 6, a sponge member 30 for heat insulation is provided above the fourth line 24 on the rear end surface 413a of the third bottom plate 413. The sponge member 30 is attached to the rear end surface 143a of the third bottom plate 413 across substantially the full crosswise width, and the top portion thereof is adhered to the counterweight 8. Specifically, the sponge member 30 is disposed so as to separate the third gap G3 in which the fourth line 24 is disposed and the engine room S1 in which the engine 6 is disposed.

Effects

The fuel of the hydraulic excavator 1 is fed through the first line 21 from the fuel tank 7 to the fuel filter 14 and then supplied through the second line 22 from the fuel filter 14 to the fuel injection device of the engine 6. At this time, an excess of fuel is fid to the fuel cooler 9 via the third line 23. The fuel cooled by the fuel cooler 9 is returned through the fourth line 24 to the fuel tank 7.

At this time, the third gap G3 in which the fourth line 24 is disposed is open to the atmosphere along with the first gap G1 and the second gap G2. Therefore, the atmosphere is guided into the third gap G3 and the fuel passing through the fourth line 24 is also cooled by the atmosphere. Moreover, heat from the engine room S1 is shielded by the sponge member 30, and direct contact by hot air from the engine room S1 on the fourth line 24 can be avoided.

Moreover, dirt and the like may enter the inside from the gap (first gap G1) between the bottom plate 41 of the rotating frame 4 and the bottom end portion of the counterweight 8 while working. However, the fourth line 24 is disposed at a position that does not overlap with the first gap G1 in the front to back direction. Specifically, the second bottom plate 412 and the first bottom plate 411 are disposed below the fourth line 24, and the fourth line 24 is disposed so as not to look directly to the outside through the first gap G1. Therefore, direct contact of intruding dirt and the like on the fourth line 24 can be avoided.

Characteristics (1) The fourth line (return line) 24 is provided in the third gap G3 between the rear end surface of the rotating frame 4 and the bottom end portion of the counterweight 8, and the third gap G3 is open to the atmosphere. Moreover, the gap in which the fourth line 24 is disposed and the engine room S1 are separated by the sponge member 30 having a heat insulation effect. Therefore, the fourth line is not easily affected by heat from the engine and furthermore is cooled by the atmosphere so that a rise in the temperature of the fuel that passes through the inside is suppressed.

(2) Although the third gap G3 in which the fourth line 24 is disposed is open to the atmosphere, the fourth line 24 is disposed so as not to overlap the first gap G1 in the front to back direction. Specifically, rear end portions of the first bottom plate 411 and the second bottom plate 412 that configure the rotating frame 4 are positioned below the fourth line 24. Therefore, dirt that has intruded through the gap is prevented from directly hitting the fourth line 24 so that damage to the fourth line 24 can be prevented.

Other Embodiments

The present invention is not limited to the above embodiment and various changes and modifications may be made without departing from the spirit of the invention.

Figure 7:
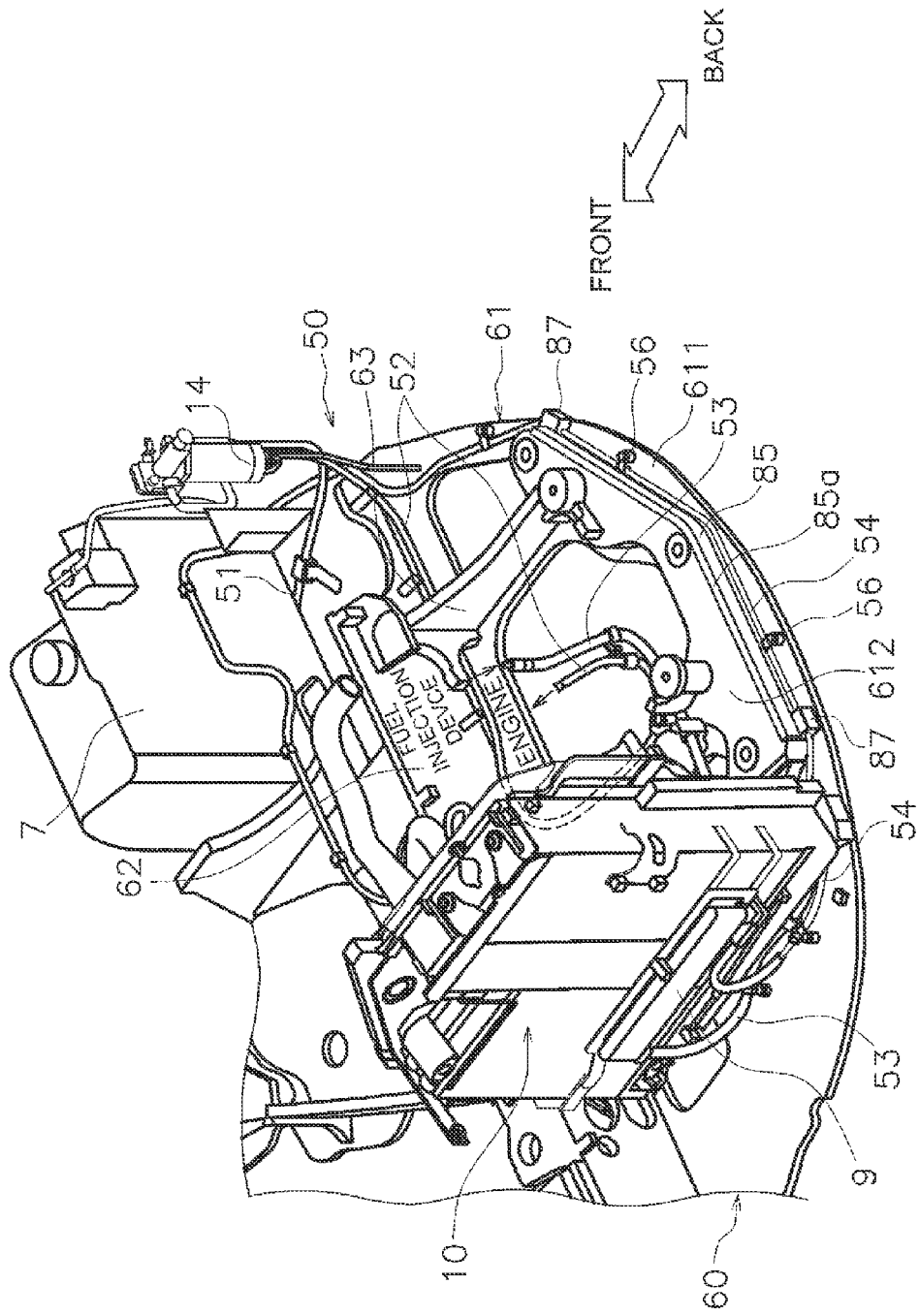
FIG. 7 is a diagram corresponding to FIG. 2 according to another embodiment of the present invention.
Figure 8:
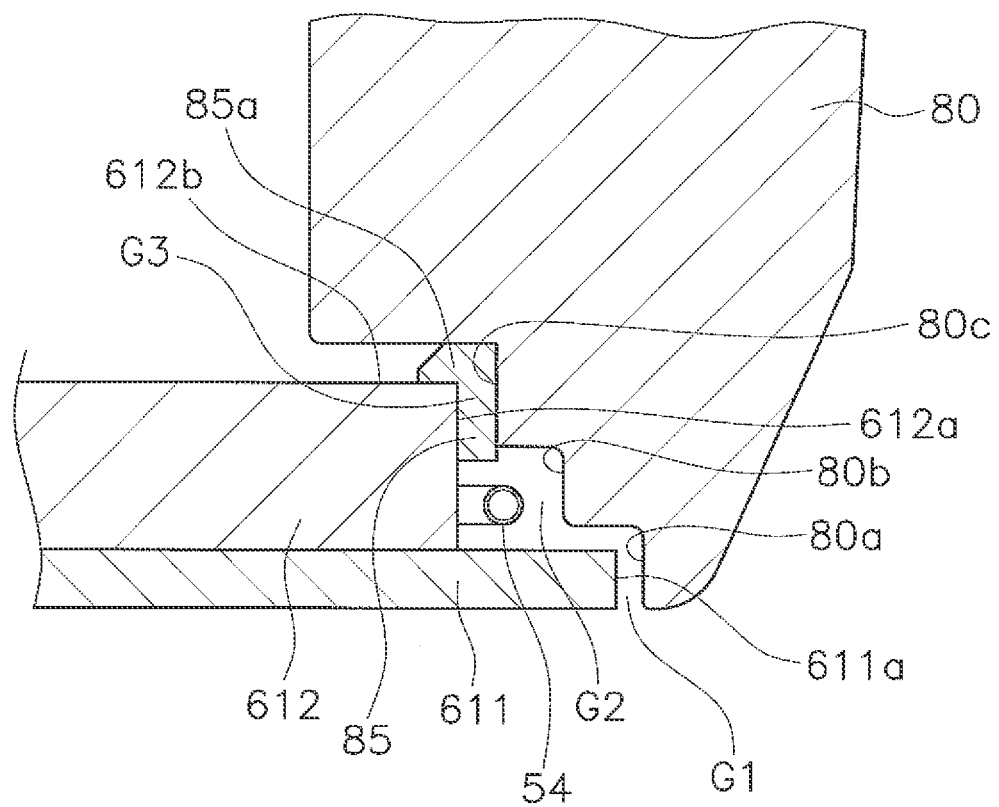
FIG. 8 is a diagram corresponding to FIG. 5 according to another embodiment of the present invention.

(a) Another embodiment is illustrated in FIGS. 7 and 8. In this embodiment, the disposition of a fuel line 50, the configuration of a rotating frame 60, and the shape of a counterweight 80 are different than those of the previous embodiment; however, other configurations are substantially the same as those of the previous embodiment.

The fuel flows through a path from the fuel tank 7 to the fuel filter 14 to the engine 6 to the fuel cooler 9 to the fuel tank 7 in the same way as the previous embodiment. The fuel line 50 that is laid between these elements includes a first line 51 to a fourth line 54.

The first line 51 is coupled to the fuel tank 7 and the fuel filter 14, The second line 52 is coupled to the fuel filter 14 and an engine. The second line 52 extends downward from the fuel filter 14 to a bottom plate 61 of the rotating frame 60. The second line 52 extends along a bottom end portion of a transverse plate 62 that is the top surface of the bottom plate 61 and that configures the rotating frame 60, to a middle portion in the crosswise direction, and further extends upward to be coupled to the fuel injection device of the engine. The transverse plate 62 is a member that is coupled to the left and right upright plates (only a right side upright plate 63 is shown in FIG. 7) in the crosswise direction, and is disposed between the engine room S1 and a forward space.

The third line 53 is coupled to the fuel injection device of the engine and the fuel cooler 9. The third line 53 extends downward from the fuel injection device, passes below the cooling unit 10 and extends to the outside of the vehicle (left direction), and is coupled to the fuel cooler 9.

The fourth line 54 that functions as the return line is coupled to the fuel cooler 9 and the fuel tank 7. The fourth line 54 extends from the bottom end portion of the fuel cooler 9, passes below the cooling unit 10 to extend to the inside (right direction), and extends along the rear end surface of the bottom plate 61 of the rotating frame 60 to the right side end portion of the bottom plate 61. The fourth line 54 then is coupled to the fuel tank 7.

The bottom plate 61 of the rotating frame 60 includes a first bottom plate 611 formed with a thick plate, and a reinforcement second bottom plate 612 provided at the rear portion of the first bottom plate 611 as illustrated in FIGS. 7 and 8. A rear end surface 611a of the first bottom plate 611 protrudes to the back further than a rear end surface 612a of the second bottom plate 612 to be formed in a step-like manner due to the bottom plates 611, 612.

On the other hand, the bottom end portion of the counterweight 80 includes a first end surface 80a that faces the rear end surface 611a of the first bottom plate 611, and a second end surface 80b and a third end surface 80c that face the rear end surface 612a of the second bottom plate 612. The first end surface 80a is positioned the furthest to the back, the first end surface 80a is positioned further to the front than the second end surface 80b, and the third end surface 80c is positioned further to the front than the second end surface 80b. A first gap G1 is formed. between the rear end surface 611a of the first bottom plate 611 and the first end surface 80a of the counterweight 80. A second gap G2 is formed between the rear end surface 612a of the second bottom plate 612 and the second end surface 80b of the counterweight 80, and a third gap G3 is formed between the rear end surface 612a of the second bottom plate 612 and the third end surface 80c of the counterweight 80. A space in the front to back direction is narrowest in the first gap G1, and is wider than the first gap G1 in the second gap G2. Moreover, the third gap G3 is wider than the first gap G1 and narrower than the second gap G2. The gaps G1 to G3 are open to the atmosphere and the atmosphere is able to intrude into the gaps G1 to G3.

The fourth line 54 is disposed along the rear end surface 612a of the second bottom plate 612 in the second gap G2, and is supported on the first bottom plate 611 by a. plurality of clamps 56. Additionally, the fourth line 54 is disposed at a position that does not overlap with the first gap G1 in the front to back direction. Specifically, the first bottom plate 611 is disposed below the fourth line 54, and the fourth line 54 is not disposed so as to look directly to the outside.

A sponge member 85 for heat insulation is provided in the third gap G3. The sponge member 85 is attached to the rear end surface 612a of the second bottom plate 612 along substantially the full crosswise width. An extension 85a that extends forward is formed at the top of the sponge member 85. The extension 85a is disposed between an upper surface 612b of the second bottom plate 612 and the counterweight 80. Due to this sponge member 85, the engine room S1 in which the engine is disposed and the second gap in which the fourth line 54 is disposed are separated.

Additionally, a pair of sealing members 87 are provided below both right and left end portions of the sponge member 85. The sealing members 87 are provided on the first bottom plate 611 to seal the gap between the top surface of the first bottom plate 611 and the bottom surface of the sponge member 85. The sealing members 87 have holes to allow the fourth line 54 to penetrate therethrough. The fourth line 54 passes through the through holes of the sealing members 87 and is supported by the plurality of clamps 56 and the first bottom plate 611.

Effects similar to those of the previous embodiment are achieved in the present embodiment. Specifically, since the fourth line 54 is disposed in the second gap G2 that is open to the atmosphere and the second gap G2 and the engine room S1 are separated by the sponge member 85, a rise in the temperature of the fuel that flows inside the fourth line 54 can be suppressed. Moreover, in this embodiment, since the sealing members 87 are provided at the right and left end portions of the sponge member 85, the intrusion of heat from the engine through the gap in which the fourth line 54 is provided can be reliably prevented.

Moreover, since the rear end portion of the first bottom plate 611 that configures the rotating frame 60 is positioned below the fourth line 54, dirt and the like that has intruded through the first gap G1 can be prevented from hitting the fourth line 54 directly and damaging the fourth line 54.

(b) Although the heat insulating sponge member is fixed to the rotating frame in the embodiment, the sponge member may be provided on the counterweight. Moreover, the heat insulation member is not limited to a sponge member.

(c) Although the return line of the fuel line is provided in the gap between the rotating frame and the counterweight in the embodiment, another fuel line such as the fuel line from the fuel filter to the engine may also be provided in the gap between the rotating frame and the counterweight.

In the hydraulic excavator of the present invention, fuel that flows through the fuel line is not easily affected by heat from the engine and is cooled by the atmosphere to suppress a rise in the temperature since the fuel. line is disposed in a gap between the counterweight and the rotating frame and the gap is open to the atmosphere.

What is claimed is:

1. A hydraulic excavator comprising:
an undercarriage having a crawler; and
a rotating superstructure supported in a rotatable manner above the undercarriage; wherein,
the rotating superstructure includes
a plate-shaped rotating frame,
an engine disposed in an engine room, the engine room being formed above the rotating frame,
a fuel tank disposed on one side of the engine,
a counterweight supported on the rotating frame to the rear of the engine, and disposed so that a bottom end portion faces a rear end surface of the rotating frame with a gap interposed therebetween and the gap being open to the atmosphere,
a fuel line connected to the fuel tank and disposed in the gap between the rear end surface of the rotating frame and the bottom end portion of the counterweight; and
a heat insulation member separating the gap in which the fuel line is disposed and the engine room.

2. The hydraulic excavator according to claim 1, wherein:
the rear end surface of the rotating frame has a first end surface formed at a bottom end, and a second end surface formed above the first end surface and further forward than the first end surface,
the gap has a first gap formed between the first end surface and the bottom end portion of the counterweight, and a second gap wider than the first gap and formed between the second end surface and the bottom end portion of the counterweight; and
a portion of a bottom plate of the rotating frame is disposed directly below the fuel line in the second gap.

3. The hydraulic excavator according to claim 1, further comprising
   a fuel cooler disposed on another side of the engine, wherein
   the fuel line is a return line from the fuel cooler to the fuel tank.

4. A hydraulic excavator comprising:
   an undercarriage having a crawler; and
   a rotating superstructure supported in a rotatable manner above the undercarriage; wherein,
   the rotating superstructure includes
      a plate-shaped rotating frame, a rear end surface of the rotating frame having a first end surface formed at a bottom end and a second end surface formed above the first end surface and further forward than the first end surface,
      an engine mounted inside the rotating frame,
      a fuel tank disposed on one side of the engine,
      a counterweight supported on the rotating frame to the rear of the engine, and disposed so that a bottom end portion faces the rear end surface of the rotating frame with a gap interposed therebetween and the gap being open to the atmosphere,
      a fuel line connected to the fuel tank and disposed in the gap between the rear end surface of the rotating frame and the bottom end portion of the counterweight,
      the gap having a first gap formed between the first end surface and the bottom end portion of the counterweight, and a second gap wider than the first gap and formed between the second end surface and the bottom end portion of the counterweight, and
      a portion of a bottom plate of the rotating frame disposed directly below the fuel line in the second gap.

5. The hydraulic excavator according to claim 4, wherein
   an engine room having the engine disposed therein is formed above the rotating frame, and
   the engine room and the gap in which the fuel line is disposed are shielded.

6. The hydraulic excavator according to claim 5, further comprising
   a heat insulation member that separates the gap in which the fuel line is disposed and the engine room.

7. The hydraulic excavator according to claim 5, further comprising
   a fuel cooler disposed on another side of the engine, wherein
   the fuel line is a return line from the fuel cooler to the fuel tank.

* * * * *